United States Patent [19]

Weman

[11] 4,067,612
[45] Jan. 10, 1978

[54] SAFETY BELT TENSION RELIEVING APPARATUS

[75] Inventor: Per Olof Weman, Heverlee, Belgium

[73] Assignee: N.V. Klippan S.A., Haasrode, Belgium

[21] Appl. No.: 662,986

[22] Filed: Mar. 1, 1976

[51] Int. Cl.² .............................................. A62B 35/00
[52] U.S. Cl. .................................. 297/389; 242/107.2; 242/107.4 R; 297/388
[58] Field of Search ............... 297/388, 389, 385; 280/744, 747; 200/61.58 B; 242/107.4 R, 107.6, 107.2

[56] References Cited

U.S. PATENT DOCUMENTS

| 3,240,510 | 3/1966 | Spouge | 242/107.4 A |
| 3,770,315 | 11/1973 | Smittle | 297/284 |
| 3,866,975 | 2/1975 | Fricko | 297/389 |
| 3,930,682 | 1/1976 | Booth | 200/61.58 B |

Primary Examiner—James T. McCall
Attorney, Agent, or Firm—Ernest D. Buff

[57] ABSTRACT

Apparatus for relieving belt tension on the shoulder belt of a vehicle safety seat belt system is provided. The apparatus has a locking means pneumatically actuated from an unlocking position to a locking position which relieves belt tension on a vehicle occupant when the occupant leans against the back of the seat.

9 Claims, 8 Drawing Figures

SAFETY BELT TENSION RELIEVING APPARATUS

BACKGROUND OF THE INVENTION

This invention relates to a safety seat belt system for vehicle occupants and more particularly to means for relieving belt tension otherwise exerted on the user by the retractor rewind mechanism of the belt system.

Safety belt systems for motor vehicles typically include a shoulder belt and a retractor having a rewind mechanism biased to rewind the shoulder belt into the retractor. The tension produced by the rewind mechanism of the shoulder belt retractor frequently causes discomfort to an occupant using the shoulder belt of the vehicle safety belt system. Various devices have been proposed for relieving tension in vehicle shoulder belts. Such devices include those disclosed in U.S. Pat. Nos. 3,719,972 to Klink; 3,700,184 to Francis; 3,550,875 to Settini; 3,771,742 to Okada; 3,695,546 to Takada; 3,682,412 to Kuszynski; 3,930,682 to Booth. Each of these devices is expensive to construct, requiring the presence of electrical components or a relatively large number of parts that may become unreliable in operation when exposed to changing climatic conditions for prolonged periods of time. None of them permits actuation of the tension-relieving components pneumatically and/or manually with one finger. As a result, such previous tension-relieving devices are more expensive to produce, harder to use and less reliable in operation than those considered to be commerically acceptable.

SUMMARY OF THE INVENTION

The present invention provides an improved, economical and highly reliable safety belt tension-relieving apparatus wherein the tension-relieving components are actuated pneumatically and/or manually witth one finger. The apparatus is associated with a seat-belt system including a shoulder belt and a retractor having a rewind mechanism biased to rewind the shoulder belt on a reel of the retractor. The tension-relieving apparatus is adapted to relieve tension on the shoulder belt by the rewinding mechanism of the shoulder belt retractor and has a locking means disposed adjacent to the safety belt and remote from the retractor. Such locking means has a locking position and an unlocking position and is adapted to be actuated from its unlocking position to its locking position to prevent further rewind of the shoulder belt into the retractor. A biasing means is provided for biasing the locking means in its unlocking position. Actuation of the locking means is effected manually with one finger or pneumatically by an actuating means having a first portion disposed in the back of the seat and a second portion connected to the locking means. Such actuation moves the locking means to the locking position to relieve belt tension when the occupant leans against the back of the seat.

The apparatus of this invention has advantageous, structural features. Very few parts are required for construction of the tension-relieving apparatus. Each of such parts is easily fabricated and relatively strong. As a result, the tension-relieving apparatus is quickly and easily assembled at minimal cost to form a remarkably sturdy unit. The pneumatic actuating means provides for automatic tension relief without necessitating use of electrical components, which are usually more expensive and less reliable in operation. Manual actuation is readily effected with a single finger without undue manual manipulations which could distract the driver-user during operation of the vehicle. As a result, the safety belt tension-relieving apparatus of this invention is less expensive to produce and safer and more reliable in operation than previous safety belt tension-relieving apparatus.

BRIEF DESCRIPTION OF THE DRAWINGS

The invention will be more fully understood and further advantages will become apparent when reference is made to the following detailed description and the accompanying drawings in which.

DESCRIPTION OF THE PREFERRED EMBODIMENTS

Figure 1:
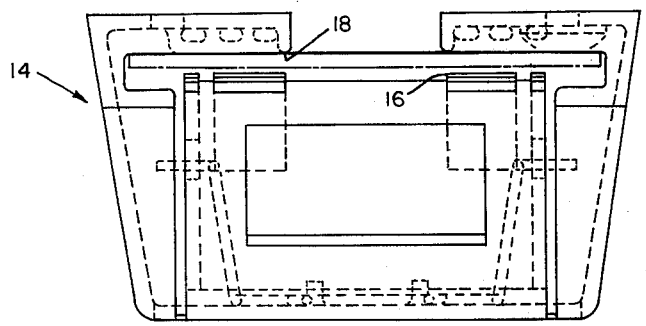
FIG. 1 is a plan view of a tension-relieving apparatus incorporating the elements of this invention.

Referring to the drawings there is illustrated one form of a vehicle safety seat belt system incorporating the tension-relieving apparatus of the present invention. Other forms of the seat belt system can also be used. The system, shown generally at 1 in the drawings should therefore be interpreted as illustrative and not in a limiting sense. As illustrated, the seat belt system 1, has a shoulder belt 10 and a retractor 12. The retractor 12 has a rewind mechanism, such as a torsion return spring or the like, biased to rewind the shoulder belt 10 into the retractor 12. Each of the belt 10, retractor 12 and rewind mechanism is constructed and operated in a conventional manner. The safety belt system 1 has incorporated therewith a tension-relieving apparatus, shown generally at 14, comprising the improvement of the present invention.

Figure 2:
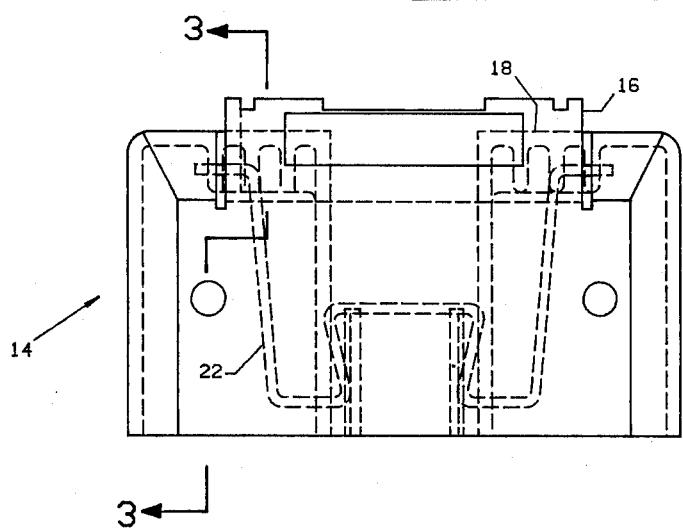
FIG. 2 is a frontal view of the tension-relieving apparatus of FIG. 1.
Figure 3:
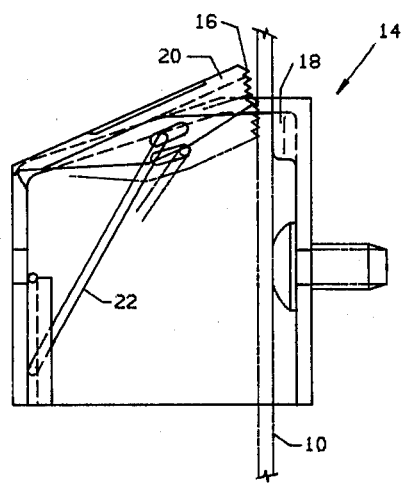
FIG. 3 is a section taken along line 3—3 of FIG. 2.
Figure 5:
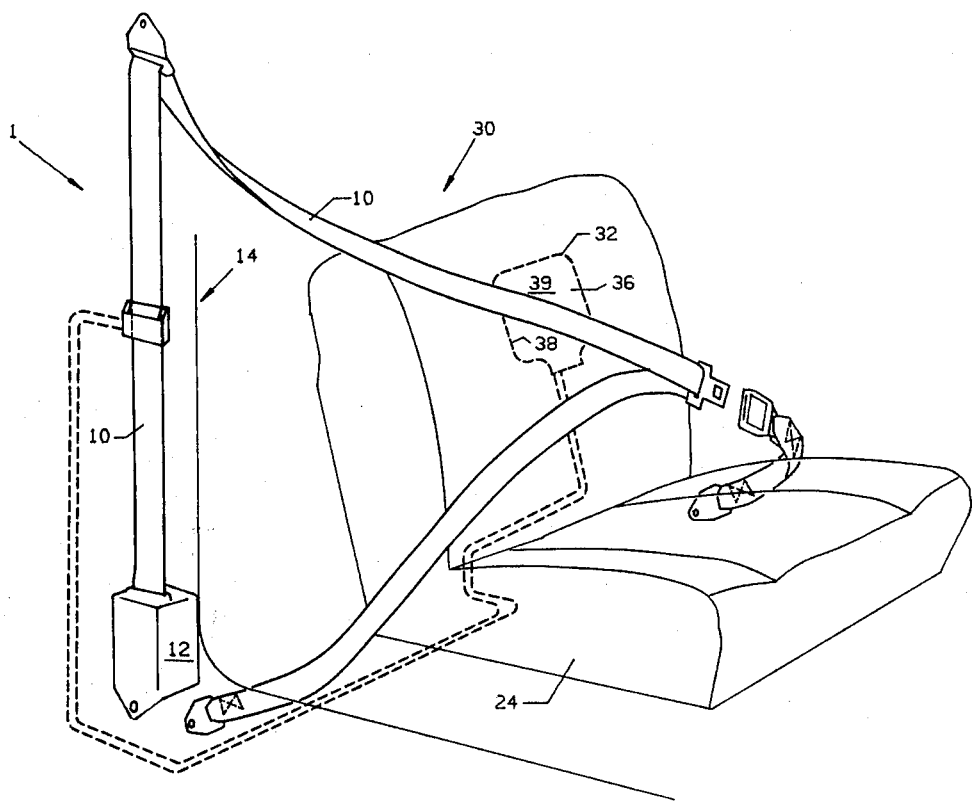
FIG. 5 illustrates a safety seat belt system incorporating the embodiment of FIG. 4 disposed in a vehicle.
Figure 6:
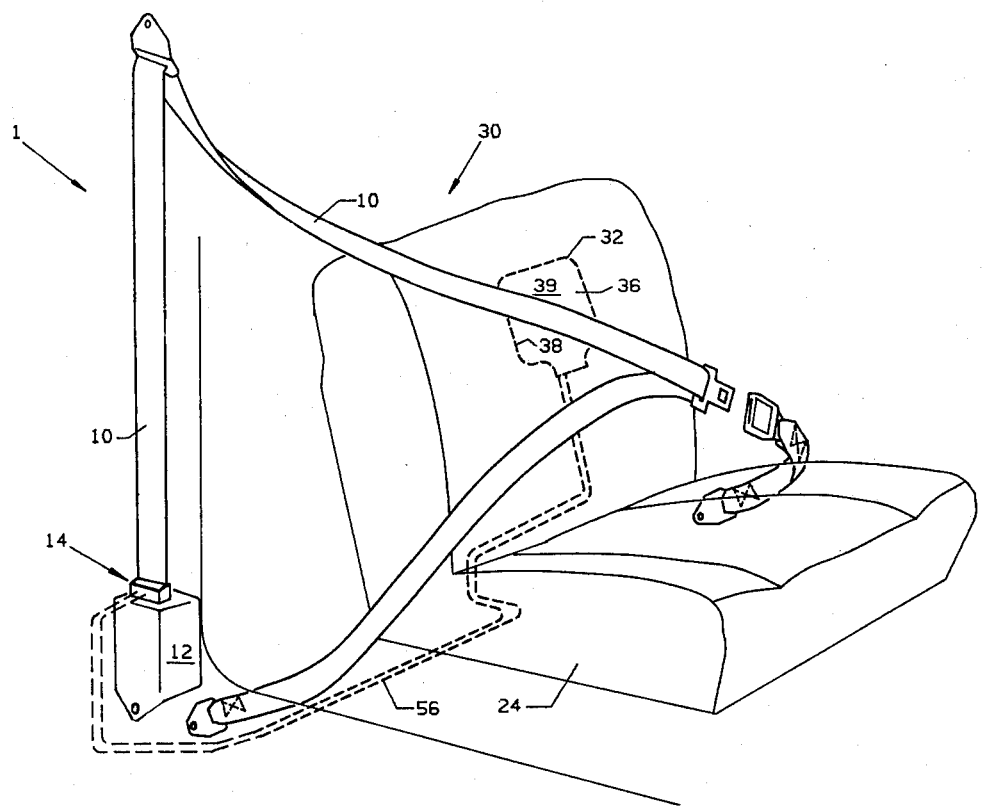
FIG. 6 illustrates a safety belt system incorporating still another embodiment of the present invention.
Figure 7:
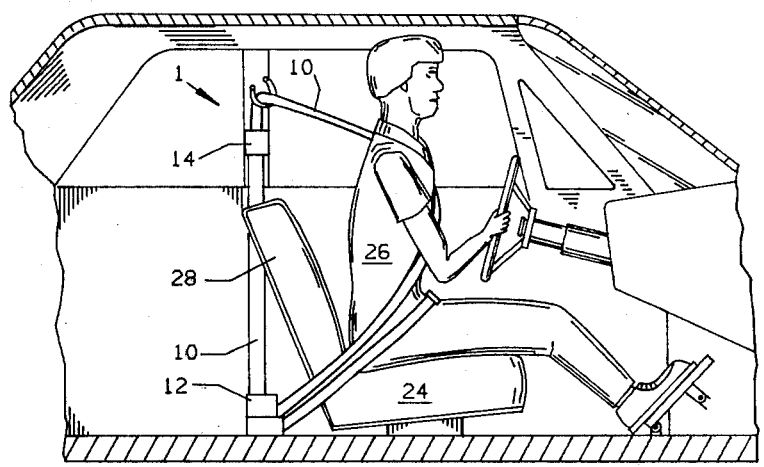
FIGS. 7 and 8 illustrate an unlocking and locking condition, respectively, of the present safety seat belt tension-relieving apparatus.
Figure 8:
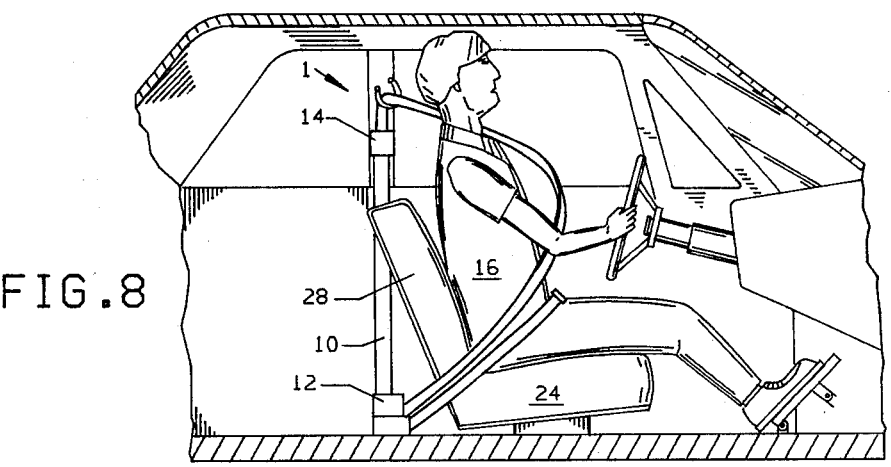

Referring to FIGS. 1–3, the tension-relieving apparatus 14 has a locking means 16 such as clamp bar 20 and supporting member 18 disposed adjacent to the shoulder belt 10 and remote from the retractor (shown at 12 in FIGS. 5–6). Locking means 16 has a locking position and an unlocking position represented, respectively, by phantom and solid lines in FIG. 3. In its locking position, the locking means 16 causes clamp bar 20 to engage the belt 10 and holds it against supporting member 18 thereby preventing further rewinding of the belt 10 into retractor 12. A biasing means 22, such as a leaf spring or the like, biases the locking means into an unlocking position in which clamp bar 20 does not engage belt 10, and protraction and retraction of the belt 10 is permitted. The locking means 16 is especially adapted to be actuated manually from its locking position to its unlocking position. Actuation of the locking means 16 is effected when the user leans against the back portion of the seat 24 and presses clamp bar 20 against supporting member 18. Such pressure by clamp bar 20 against shoulder belt 10 and supporting member 18 counteracts the force of the rewind mechanism of retractor 12, thereby relieving tension on the shoulder belt 10. So long as the occupant continues to lean against the back of seat 24, retraction of belt 10 is prevented. If the occupant leans forward, exerting a force on belt 10 in the protracting direction, clamp bar 20 lifts upwardly to a point of disengagement with belt 10, permitting the latter to be freely protracted or retracted.

Figure 4:
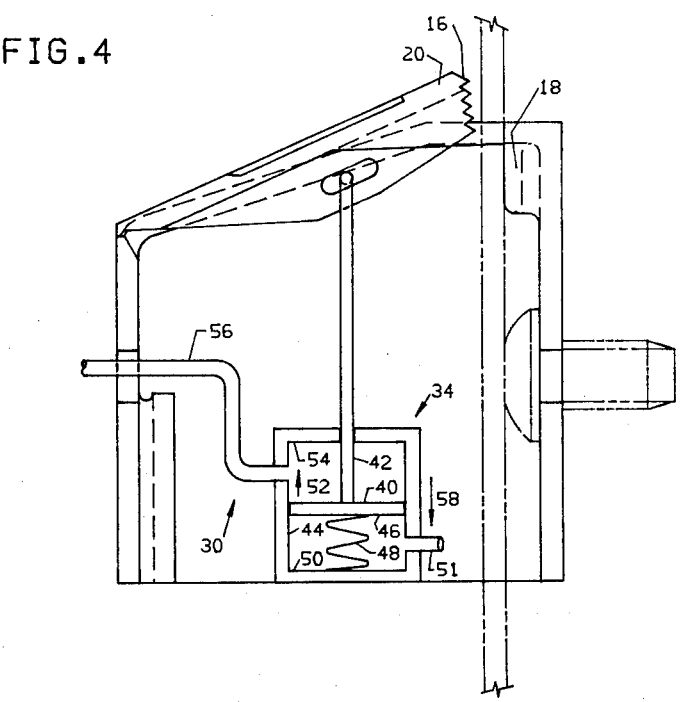
FIG. 4 is a sectional view similar to that of FIG. 3 but incorporating an alternate embodiment of the present invention.

In FIGS. 4-5 there is illustrated, an automatic actuating means 30. The actuating means 30 has a first portion 32 disposed in the back of seat 24 and a second portion 34 connected to clamp bar 20 of locking means 16. First portion 32 is a hollow chamber 36 having flexible walls 38 formed of rubber, or the like. The interior of chamber 36 is filed with a compressible fluid 39 such as air. Second portion 34 includes a piston 40 connected through shaft 42 to clamp bar 20 and adapted for movement within cylinder 44. The bottom 46 of piston 40 is connected to compression spring 48, which rests on wall 50 of cylinder 44 and biases piston 40 in the direction of arrow 52. Interior part 54 of cylinder 44 disposed above piston 40 communicates with the interior of chamber 36 via conduit 56. Each of the piston 40, cylinder 44, shaft 42, clamp bar 20, supporting member 18 and conduit 56 can be constructed of plastic or the like. Preferably, the clamp bar 20 and supporting member 18 are comprised of a unitary structure. The automatic actuating means 30 can be located remote from the retractor 12, as shown in FIG. 5, or be incorporated thereinto, as shown in FIG. 6. Moreover, the first portion 32 can be adapted to pneumatically actuate a pawl and ratchet mechanism disposed in the retractor 12.

In operation, referring to FIGS. 5-8, actuation of locking means 16 is effected automatically when the seated occupant 26 leans back far enough so that the small of his back presses against the back portion 28 of seat 24. The pressure exerted by the small of the seated occupant's back against the first portion 32 of actuating means 30 decreases the volume of chamber 36. Compressible fluid 39 in chamber 36 is forced through conduit 56 into interior part 54 of cylinder 44, raising the pressure therein. This pressure increase forces piston 40 to move in the direction of arrow 58 against the biasing force of spring 48, driving fluid 39 from cylinder 44 through vent 51. Clamp bar 20 is thereby moved into the locking position and further rewinding of shoulder belt 10 is opposed. This opposition to the rewinding force on shoulder belt 10 continues until the occupant 26 leans forward, producing a force on belt 10 in the protracting direction and removing the pressure exerted by the small of his back against chamber 36. The volume of chamber 36 increases, drawing compressible fluid 39 from interior part 54 into chamber 36 through conduit 56. Pressure of compressible bar 20 is moved to the unlocking position. Advantageously, the combination of forces produced on clamp bar 20 during pneumatic actuation of the locking means 16 reduces the force otherwise needed to move clamp bar 20 from the locking to the unlocking position.

Having thus described the invention in rather full detail, it will be understood that these details need not be strictly adhered to but that various changes and modifications may suggest themselves to one skilled in the art, all falling within the scope of the invention as defined by the subjoined claims.

I claim:

1. In a vehicle safety belt system adapted to restrain an occupant in a vehicle seat, the safety belt system including a shoulder belt and a retractor having a rewind mechanism biased to rewind the shoulder belt on a reel of the retractor, the improvement of a shoulder belt, tension-relieving apparatus adapted for relieving tension on the shoulder belt by the rewinding mechanism of the retractor, said safety shoulder belt tension-relieving apparatus comprising:

a. locking means disposed adjacent to said safety belt, having a locking position and an unlocking position and being adapted to be actuated from its unlocking to its locking position, said locking means in its locking position preventing further rewind of the shoulder belt into the retractor;

b. biasing means biasing said locking means in its unlocking position; and c. pneumatic actuating means having a first portion disposed in the back of said seat and a second portion connected to said locking means for moving said locking means to the locking position to relieve belt tension when said occupant leans against said back of said seat.

2. A safety belt system as recited in claim 1, wherein said first portion comprises a hollow chamber having flexible walls and containing compressible fluid and said second portion comprises a piston connected to said locking means and adapted for movement within a cylinder against the biasing force of a spring, said cylinder having an interior part disposed above said piston and in communication with said chamber.

3. A safety belt system as recited in claim 1, wherein said locking means comprises a clamp bar and a supporting member.

4. A safety belt system as recited in claim 1, wherein said locking means is disposed remote from said retractor.

5. A safety belt system as recited in claim 3, wherein said clamp bar and said supporting member are comprised of a unitary structure.

6. In a vehicle safety belt system adapted to restrain an occupant in a vehicle seat, the safety belt system including a shoulder belt and a retractor having a rewind mechanism biased to rewind the shoulder belt on a reel of the retractor, the improvement of a shoulder belt, tension-relieving apparatus adapted for relieving tension on the shoulder belt by the rewinding mechanism of the retractor, said safety shoulder belt tension-relieving apparatus comprising:

locking means, including a clamp bar, disposed adjacent to said safety belt having a locking position and an unlocking position and being adapted to be manually actuated from its unlocking position to its locking position with a single finger to relieve belt tension when said occupant leans against the back portion of said seat.

7. A safety belt system as recited in claim 6, wherein said locking means comprises a clamp bar and a supporting member.

8. A safety belt mechanism as recited in claim 7, wherein said clamp bar and said supporting member are comprised of a unitary structure.

9. A safety belt system as recited in claim 6, wherein said locking means is disposed remote from said retractor.

* * * * *